United States Patent
Souyri et al.

(10) Patent No.: US 10,689,185 B2
(45) Date of Patent: Jun. 23, 2020

(54) DIFFUSER ASSEMBLY FOR AEROSOL

(71) Applicant: COMPAGNIE GENERALE DES ESTABLISSEMENTS MICHELIN, Clermont-Ferrand (FR)

(72) Inventors: Philippe Souyri, Clermont-Ferrand (FR); Olivier Reboullet, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/474,306

(22) PCT Filed: Dec. 27, 2017

(86) PCT No.: PCT/IB2017/058429
§ 371 (c)(1),
(2) Date: Jun. 27, 2019

(87) PCT Pub. No.: WO2018/122738
PCT Pub. Date: Jul. 5, 2018

(65) Prior Publication Data
US 2019/0337711 A1 Nov. 7, 2019

Related U.S. Application Data

(60) Provisional application No. PCT/IB2017/058429, filed on Dec. 27, 2017.

(30) Foreign Application Priority Data

Dec. 27, 2016 (FR) ..................................... 16 70791

(51) Int. Cl.
*B65D 83/14* (2006.01)
*B29C 73/16* (2006.01)
(Continued)

(52) U.S. Cl.
CPC .......... *B65D 83/756* (2013.01); *B29C 73/166* (2013.01); *B65D 83/206* (2013.01); *B65D 83/226* (2013.01)

(58) Field of Classification Search
CPC .. B65D 83/756; B65D 83/226; B65D 83/206; B65D 83/24; B29C 73/166; B60C 25/16
See application file for complete search history.

(56) References Cited

U.S. PATENT DOCUMENTS 6,708,849 B1 * 3/2004 Carter ................... B65D 83/20
222/153.1
8,360,280 B2 1/2013 Tournier
(Continued)

FOREIGN PATENT DOCUMENTS

EP 2 881 337 A1 6/2015
FR 2403113 A1 4/1979
(Continued)

OTHER PUBLICATIONS

International Search Report dated Mar. 16, 2018, in corresponding PCT/IB2017/058429 (6 pages).

*Primary Examiner* — Donnell A Long
(74) *Attorney, Agent, or Firm* — Venable LLP

(57) ABSTRACT

An aerosol product diffuser assembly comprises: a diffuser block (1) comprising an annular casing (2) inside which a cam actuator (3) is mounted axially mobile, a control lever (10) provided with a planar body (12) making it possible to control the diffusion of the aerosol liquid said cam actuator (3) comprising: (i) an axially mobile cam follower plate (4); (ii) an aerosol bottle nozzle housing (5), arranged on the cam follower plate (4); (iii) a duct (6a) connected to the nozzle housing and enabling the liquid to diffuse to a discharge point of the aerosol liquid, the control lever (10) being pivotably mounted on the annular casing (2), and the cam
(Continued)

actuator (3) being able to be pushed axially towards the aerosol bottle by at least one pivoting cam (15).

8 Claims, 2 Drawing Sheets

(51) Int. Cl.
    *B65D 83/20*     (2006.01)
    *B65D 83/22*     (2006.01)

(56) References Cited

U.S. PATENT DOCUMENTS

| | | | |
|---|---|---|---|
| 9,862,536 B2 | 1/2018 | Arora et al. | |
| 2005/0017027 A1* | 1/2005 | Yerby | B65D 83/206 222/402.13 |
| 2005/0061014 A1* | 3/2005 | Cannan | B60H 1/00585 62/292 |
| 2005/0230436 A1* | 10/2005 | Marroncles | B65D 83/206 222/402.13 |
| 2008/0164285 A1* | 7/2008 | Hygema | B65D 83/16 222/153.11 |
| 2009/0108021 A1 | 4/2009 | Hansen et al. | |
| 2009/0256005 A1 | 10/2009 | Tournier | |
| 2011/0068132 A1 | 3/2011 | Kou | |
| 2011/0215113 A1 | 9/2011 | Hansen et al. | |
| 2012/0097713 A1 | 4/2012 | MacKinnon et al. | |
| 2015/0059921 A1* | 3/2015 | Jhou | F04B 35/06 141/38 |
| 2016/0207693 A1* | 7/2016 | Carpenter | B65D 83/205 |
| 2017/0029201 A1 | 2/2017 | Arora et al. | |
| 2019/0322442 A1* | 10/2019 | Thomsen | B65D 83/303 |
| 2019/0337247 A1* | 11/2019 | Dowel | B29C 73/166 |

FOREIGN PATENT DOCUMENTS

| | | |
|---|---|---|
| FR | 2590503 A1 | 5/1987 |
| FR | 2907767 A1 | 5/2008 |
| WO | 2006/038487 A1 | 4/2006 |
| WO | 2011/003752 A1 | 1/2011 |
| WO | 2011/138186 A1 | 11/2011 |

* cited by examiner

DIFFUSER ASSEMBLY FOR AEROSOL

TECHNICAL FIELD OF THE INVENTION

The present invention relates to a diffuser assembly for an aerosol bottle, particularly for a bottle of tyre anti-puncture (or sealant) liquid.

PRIOR ART

Aerosol bottles have been well known for a long time. Most bottles comprise a diffuser nozzle that makes it possible to facilitate the expulsion of the liquid from the bottle.

For example, FR2403113 is known, which describes an aerosol valve designed to enable rapid filling of the aerosol can, on which it will be mounted, with liquefied propellant.

FR2590503 describes an adjustable nozzle for an aerosol atomizer. The nozzle comprises a flexible tube connected to the jet and the push-button. The jet is rotatably mounted to facilitate the use of the assembly.

FR2907767 describes a diffuser device for an aerosol can with secure actuation comprising a cap, a nozzle intended for fixing to a diffusion valve of the can, the nozzle being movable in a direction of actuation so as to actuate the diffusion valve, and an actuator suitable for causing the movement of the nozzle in the direction of actuation. The actuator has a second degree of freedom between an initial secure position in which the actuator is locked with respect to the direction of actuation and at least one unlocked position in which an actuating movement is possible, a cut-out being provided in the cap for the actuator, the actuator comprising an edge surface which is located, in the initial secure position, facing a rim of the cut-out parallel to the direction of actuation, the movement in the second degree of freedom being a movement of depression until the edge surface is clear of the rim.

Most nozzles require a significant actuation force on the part of the user. Most of the time, this force must be maintained throughout the entire expulsion phase.

The appearance of bottles of anti-puncture agent has caused a number of difficulties for the user, as the anti-puncture product must often be used in difficult circumstances, sometimes in cold weather, at night or in the rain or snow. Unlike almost all aerosol products, which are used in small quantities, such as for example air fresheners, the duration of the expulsion phase is particularly long (for example in the order of 2 to 3 minutes) for an anti-puncture product, as the entire contents of the bottle must be expelled into the tyre to be repaired.

The invention provides various technical means for overcoming these various drawbacks.

SUMMARY OF THE INVENTION

Firstly, a first aim of the invention consists of providing a control member for an aerosol bottle that makes it possible to manage the expulsion of the liquid from the bottle in a simple and ergonomic manner.

Another aim of the invention consists of providing a control member for an aerosol bottle that minimizes the mechanical force to be exerted by the user.

A further aim consists of providing a control member for an aerosol bottle that makes it possible to maintain a continuous diffusion mode while minimizing the user's force.

To this end, the invention provides for an aerosol product diffuser assembly for a pressurized bottle, comprising:

a diffuser block comprising an annular casing inside which a cam actuator is mounted axially mobile between a storage position of the aerosol and a diffusion position of the aerosol, a control lever provided with a planar body making it possible to control the diffusion of the aerosol liquid;

said cam actuator comprising:
  (i) a cam follower plate, also axially mobile and guided by guide studs fixed to the casing and engaging with corresponding notches in the cam follower plate;
  (ii) an aerosol bottle nozzle housing, arranged on the cam follower plate and suitable for receiving the nozzle of an aerosol bottle;
  (iii) a duct and a diffuser tip, connected to the nozzle housing and enabling the liquid to diffuse to a discharge point of the aerosol liquid;

the control lever being pivotably mounted on the annular casing;

the cam actuator being able to be pushed axially towards the aerosol bottle by at least one pivoting cam, mounted on the planar body of the control lever;

the cam actuator being pushed axially away from the aerosol bottle by at least one elastic fastening tab elastically connecting the cam actuator to the annular casing;

the cam actuator being formed integrally with the annular casing, thus forming a one-piece diffuser block.

Such an architecture enables easy and particularly ergonomic actuation. The large lever arm and the long angular actuation stroke of the lever make it possible to reduce the actuation force for the user. The different parts are simple to produce (for example by moulding) for a particularly favourable production cost of the assembly.

This arrangement makes it possible to maintain a prestress on the cam actuator. In addition, the tabs make it possible to manufacture the diffuser assembly from a single integrally-formed part. For example, on moulding, the tabs make it possible to ensure the injection of material from one part towards the other.

As the cam actuator is formed integrally with the annular casing, this arrangement makes it possible to manufacture the diffuser block in a single operation, and eliminates any subsequent need to assemble the annular casing and the cam actuator.

According to an advantageous embodiment, the annular casing comprises substantially facing openings that form a pivot axis P-P and the control lever comprises two pivots on opposite sides that form a pivot axis P'-P' and are capable of engaging with the openings in the annular casing to form a pivoting mounting of the control lever in the annular casing, with the axes P-P and P'-P' being superposed.

This arrangement makes it possible to manufacture the two main parts of the assembly separately and assemble them easily afterwards. The pivoting mode of the assembled parts provides easy, reliable operation.

Advantageously, the control lever comprises two cams spaced apart from each other, between which the nozzle housing can be inserted.

This arrangement makes it possible to distribute the force to be exerted by the cams appropriately.

For example, the two cams are suitable for exerting an axial force F to the bottle by contact on the cam follower plate, on each side of the nozzle housing.

According to another advantageous embodiment, the control lever comprises a breakable securing catch mounted substantially extending from the planar body.

The secured can cannot therefore be actuated accidentally, without a specific action by the user to unlock the assembly.

Advantageously, the annular casing comprises a lateral opening provided to enable the diffuser tip to project radially beyond the casing.

Advantageously, at least one cam comprises a locking nose that makes it possible to place the control lever in one or the other of the bistable positions (open or closed), the closed position corresponding to the storage position of the aerosol and the open position corresponding to the diffusion position of the aerosol.

This arrangement makes it possible to lock the assembly in a diffusion position of the aerosol. This feature is particularly useful for using a can the majority of the contents of which—or even the whole bottle—must be released, as this operation is relatively long.

The invention also provides for an aerosol can using a diffuser element as described above.

DESCRIPTION OF THE FIGURES

All of the embodiment details are given in the following description, supplemented by FIGS. 1a to 3, given solely as non-limitative examples, in which.

DETAILED DESCRIPTION OF THE INVENTION

Figure 1A:
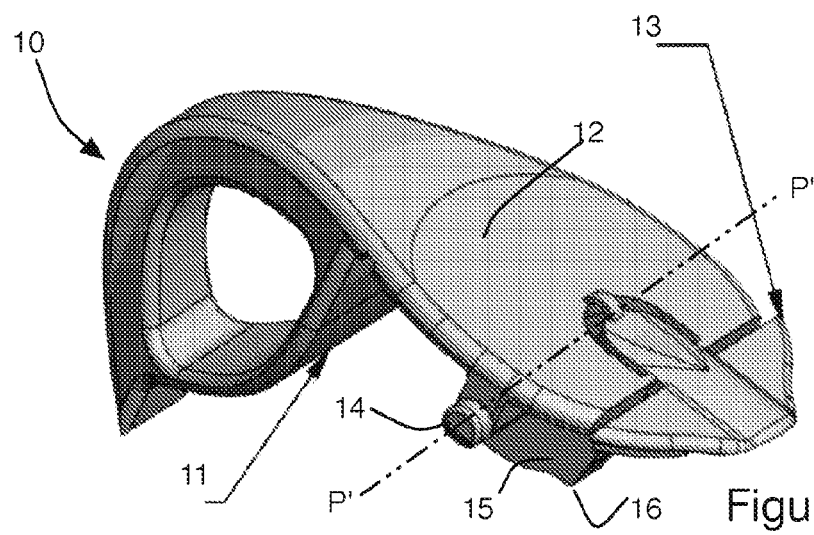
FIG. 1a is a perspective view of the control lever.
Figure 1B:
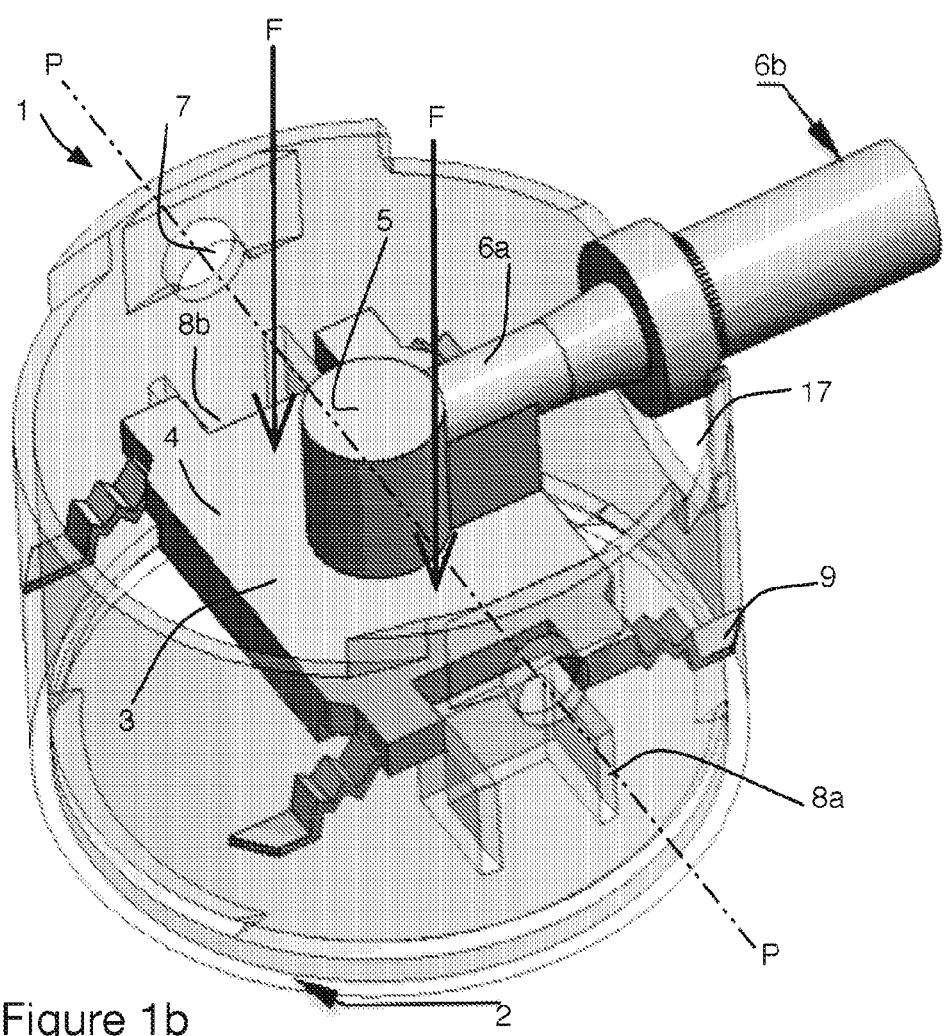
FIG. 1b is a perspective view of the diffuser block.
Figure 2:
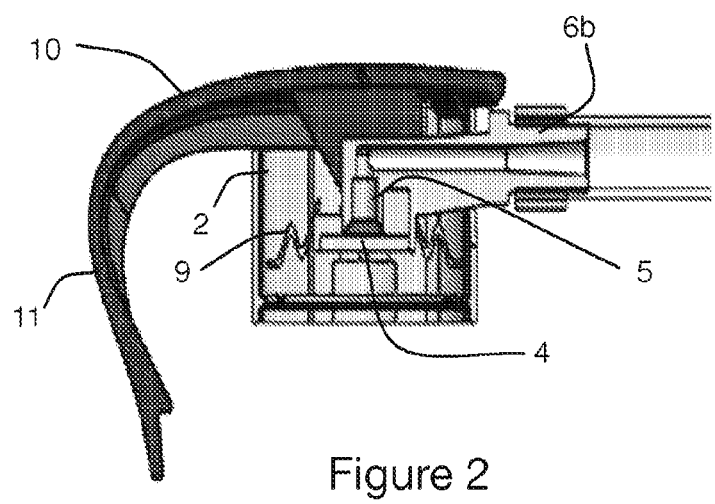
FIG. 2 is a cross-sectional view of one embodiment of a diffuser assembly.
Figure 3:
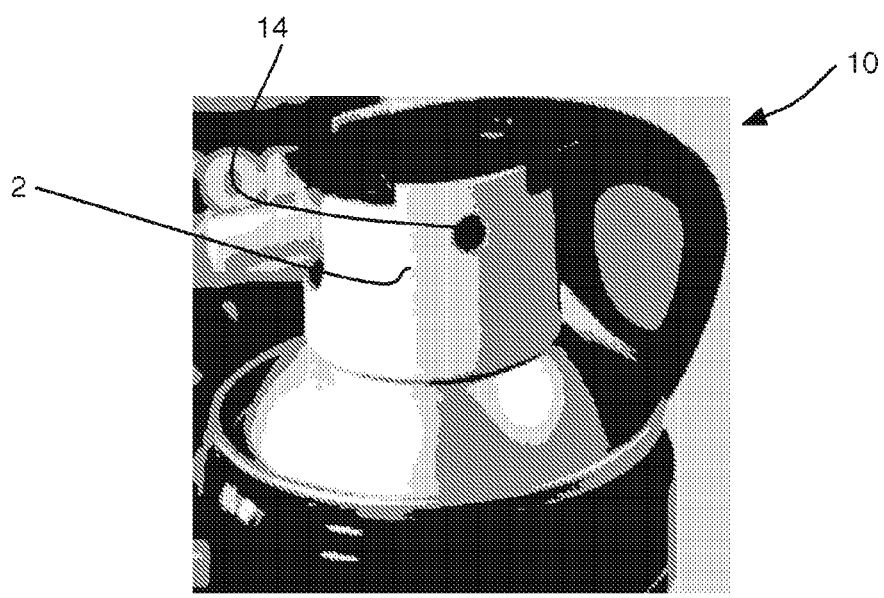
FIG. 3 is a perspective view of an aerosol bottle provided with a diffuser assembly.

FIGS. 1a and 1b show an exploded view of one embodiment of a diffuser assembly. This assembly comprises two main elements, namely a diffuser block 1 and a control lever 10. The diffuser block 1 comprises an annular casing 2 acting as a housing, inside which a cam actuator 3 is arranged. The cam actuator 3 is axially mobile between a storage position of the aerosol and a diffusion position of the aerosol. It comprises an axially mobile cam follower plate 4 the main plane of which is substantially perpendicular to the axis of the aerosol bottle. The axial guidance is provided by guide studs 8a fixed to the casing 2. These studs engage with corresponding notches 8b provided on each side of the cam follower plate 4.

The raised position of the cam actuator corresponds to the storage position of the aerosol. In this position, the nozzle of the bottle is free, in the closed position. The lowered position of the cam actuator acts as the aerosol fluid diffusion position.

To ensure the diffusion of the fluid and the actuation of the discharge of the fluid, an aerosol bottle nozzle housing 5 is arranged on the cam follower plate. This housing 5 is suitable for receiving the nozzle of an aerosol bottle.

From the housing, a duct 6a and a diffuser tip 6b, connected to the nozzle housing, make it possible to convey the fluid to a discharge point or to a connecting tube provided to convey the fluid away from the aerosol bottle.

The axial displacement of the cam actuator 3 is provided by at least one pivoting cam 15, mounted on the control lever 10. The control lever preferably comprises two cams 15 spaced apart from each other, between which the nozzle housing 5 is arranged. The two arrows F in FIG. 1b show the axial force towards the bottle exerted by the cams 15. In this example, the arrows F correspond to the axial force exerted by the two cams 15 when the control lever 10 pivots. The fastening tabs 9 exert a force in the opposite direction. This return force is preferably designed so as to enable a return to the storage position of the aerosol if necessary, by raising the cam follower plate 4. The tabs 9 are therefore advantageously sized so as to be able to exert this return force. These same tabs also make it possible to ensure the conveyance of material to be injected from the annular casing 2 towards the cam actuator 3. This supply of injectable material makes it possible to produce a single injection-moulded part.

To ensure the displacement of the cams 15 towards the cam follower plate 4 as shown by the arrows F, the control lever 10 is mounted pivotably on the annular casing 2. This pivotable mounting is provided by the openings 7 on each side of the annular casing 2, forming a pivot axis P-P. On the control lever 10, the pivots 14, arranged on opposite sides, form a corresponding pivot axis P'-P'. When the control lever 10 is assembled on the diffuser block 1, the two axes P-P and P'-P' are superposed and the two pivots 14 on opposite sides can rotate freely while ensuring that the control lever 10 is kept with the diffuser block 1. Thus, the control lever 10 is the member that makes it possible to control the diffusion of the aerosol liquid. It is made up of a substantially elongated planar body 12. When it is assembled on the diffuser block 1, this planar body makes it possible to close the top of the diffuser assembly. The cams 15 are arranged under the planar body 12. The pivots 14 are fixed to the outer sides of the cams.

The diffuser assembly is advantageously designed for use with a canister of anti-puncture fluid. For such use, it is generally necessary to decant the entire contents of the bottle into the damaged wheel. To facilitate this operation, and particularly to avoid the user having to press for several minutes on a push-button or hold the lever, the control lever is arranged so that it is able to adopt two stable positions, corresponding to the storage position of the aerosol and the diffusion position of the aerosol. This bistable mode is provided by a locking nose 16 provided on at least one of the cams 15. Positioned underneath the cam, close to the diffusion mode end position, this nose makes it possible to lock the diffuser assembly in the diffusion position of the aerosol. Designed extending from the peripheral profile of the cam 15, it forms an obstacle to be overcome before the end of the cam stroke is reached. Once the obstacle has been overcome, the diffusion position of the aerosol is reached. The obstacle formed by the nose prevents any return to the initial storage position without additional force supplied by the user via the control lever 10.

The control lever 10 also comprises a breakable securing catch 13, mounted substantially extending from the planar body 12. This catch makes it possible to prevent any unintentional activation of the diffuser assembly. It must be broken, in a location provided to this end, to enable the aerosol to be switched to diffusion mode.

As shown in FIG. 1b, the annular casing 2 comprises a lateral opening provided to enable the diffuser tip 7 to project radially beyond the casing.

REFERENCE SIGNS USED IN THE FIGURES

1 Diffuser block
2 Annular casing
3 Cam actuator
4 Cam follower plate
5 Aerosol bottle nozzle housing
6a Duct
6b Diffuser tip 7 Openings for pivots
8a Axial guide studs
8b Notches
9 Fastening tabs
10 Control lever
11 Handle
12 Planar body
13 Securing catch
14 Pivots
15 Cams
16 Locking nose
17 Lateral opening

The invention claimed is:

1. An aerosol product diffuser assembly for a pressurized bottle comprising:
 a diffuser block comprising an annular casing inside which a cam actuator is mounted axially mobile between a storage position of the aerosol and a diffusion position of the aerosol; and
 a control lever provided with a planar body making it possible to control the diffusion of the aerosol liquid,
 wherein the cam actuator comprises:
  (i) a cam follower plate, axially mobile and guided by guide studs fixed to the annular casing and engaging with corresponding notches in the cam follower plate;
  (ii) an aerosol bottle nozzle housing, arranged on the cam follower plate and suitable for receiving a nozzle of an aerosol bottle;
  (iii) a duct and a diffuser tip, connected to the nozzle housing and enabling the liquid to diffuse to a discharge point of the aerosol liquid,
 wherein the control lever is pivotably mounted on the annular casing,
 wherein the cam actuator is able to be pushed axially toward the aerosol bottle by at least one pivoting cam, mounted on the planar body of the control lever, wherein the cam actuator is pushed axially away from the aerosol bottle by at least one elastic fastening tab elastically connecting the cam actuator to the annular casing, and
 wherein the cam actuator is formed integrally with the annular casing, thus forming a one-piece diffuser block.

2. The aerosol product diffuser assembly according to claim 1, wherein the annular casing comprises substantially facing openings that form a pivot axis P-P and the control lever comprises two pivots on opposite sides that form a corresponding pivot axis P'-P' and are capable of engaging with the openings in the annular casing to form a pivoting mounting of the control lever in the annular casing, with the axes P-P and P'-P' being superposed.

3. The aerosol product diffuser assembly according to claim 1, wherein the control lever comprises two cams spaced apart from each other, between which the nozzle housing can be inserted.

4. The aerosol product diffuser assembly according to claim 3, wherein the two cams are suitable for exerting an axial force F to the bottle by contact on the cam follower plate on each side of the nozzle housing.

5. The aerosol product diffuser assembly according to claim 1, wherein the control lever comprises a breakable securing catch, mounted substantially extending from the planar body.

6. The aerosol product diffuser assembly according to claim 1, wherein the annular casing comprises a lateral opening provided to enable the diffuser tip to project radially beyond the casing.

7. The aerosol product diffuser assembly according to claim 1, wherein at least one cam comprises a locking nose that makes it possible to place the control lever in one or the other of two bistable positions, a closed position corresponding to the storage position of the aerosol and an open position corresponding to the diffusion position of the aerosol.

8. An aerosol can using an aerosol product diffuser assembly according to claim 1.

* * * * *